United States Patent
Onoyama et al.

(10) Patent No.: US 9,995,478 B2
(45) Date of Patent: Jun. 12, 2018

(54) SWITCH UNIT AND GAME MACHINE

(71) Applicant: OMRON Corporation, Kyoto-shi, Kyoto (JP)

(72) Inventors: Taichi Onoyama, Aichi (JP); Masaaki Sumi, Gifu (JP); Hiroyuki Onitsuka, Gifu (JP); Takehiro Agata, Aichi (JP); Masataka Kimura, Aichi (JP)

(73) Assignee: OMRON Corporation, Kyoto (JP)

( * ) Notice: Subject to any disclaimer, the term of this patent is extended or adjusted under 35 U.S.C. 154(b) by 144 days.

(21) Appl. No.: 15/130,657

(22) Filed: Apr. 15, 2016

(65) Prior Publication Data

US 2016/0335845 A1 Nov. 17, 2016

(30) Foreign Application Priority Data

May 14, 2015 (JP) .................. 2015-099495

(51) Int. Cl.
*H01H 13/70* (2006.01)
*F21V 33/00* (2006.01)
*F21V 8/00* (2006.01)
*G07F 17/32* (2006.01)
*G07F 17/34* (2006.01)

(52) U.S. Cl.
CPC .......... *F21V 33/008* (2013.01); *G02B 6/0051* (2013.01); *G07F 17/3209* (2013.01); *G07F 17/3211* (2013.01); *G07F 17/34* (2013.01)

(58) Field of Classification Search
None
See application file for complete search history.

(56) References Cited

U.S. PATENT DOCUMENTS

| 5,491,313 A * | 2/1996 | Bartley ............... | H01H 13/702 200/310 |
| 5,876,106 A * | 3/1999 | Kordecki .............. | G01D 5/165 200/314 |
| 9,543,091 B2 * | 1/2017 | Okazaki ............... | H01H 13/86 |
| 2012/0160643 A1 * | 6/2012 | Fujibayashi ........... | H01H 9/181 200/310 |
| 2016/0335843 A1 * | 11/2016 | Agata ................... | H01H 13/83 |
| 2016/0335844 A1 * | 11/2016 | Onoyama .............. | H01H 13/83 |

FOREIGN PATENT DOCUMENTS

JP 2014-044833 A 3/2014

* cited by examiner

*Primary Examiner* — Edwin A. Leon
*Assistant Examiner* — Lheiren Mae A Caroc
(74) *Attorney, Agent, or Firm* — Osha Liang LLP (57) ABSTRACT

A switch unit has a display part configured to display an image, and an operation part provided on the display part in a stacked manner. The operation part includes a plurality of press buttons each having a pressable top surface formed to be transparent, a transparent base having a plurality of openings formed so as to be spaced from each other in positions corresponding to a display region of the display part, while avoiding a peripheral edge of the display region, and a transparent substrate provided below the base and having a light source in a position corresponding to the outer periphery of the top surface. Each of the press buttons includes, and forms into a unit, a button body having the top surface, and a frame-like light guiding body provided in a flange shape below the button body and provided so as to cover the light source.

4 Claims, 10 Drawing Sheets

SWITCH UNIT AND GAME MACHINE

CROSS-REFERENCE TO RELATED APPLICATION

This application is based on Japanese Patent Application No. 2015-099495 filed with the Japan Patent Office on May 14, 2015, the entire contents of which are incorporated herein by reference.

BACKGROUND

Field

The present invention relates to a switch unit, and a game machine mounted with the switch unit.

Related Art

There has hitherto been a game machine, what is called a slot machine. In the slot machine, a plurality of reels displaying a plurality of types of symbols are spun. A winning combination is determined based on a matching pattern of symbols and the matched symbols which are displayed in a window when the reels stop. A prize is given to a player in accordance with the winning combination and the number of bets. Input of the number of bets, instruction to start spinning of the reels, and some other operation are performed using an operation board provided in the front of the slot machine.

This type of conventional slot machine is placed in game facilities such as a casino and the like. Machines manufactured by various game machine manufacturers are placed in the game facilities, and a player selects a machine that suits his or her preference and plays the selected one. Thus, each game facility attempts to place slot machines that are popular among the players to achieve a competitive edge over other competing game facilities. Further, for meeting requests from the game facilities, the game machine manufacturers make efforts to develop slot machines that can appeal to the players.

In the slot machine, the operation board is provided in a conspicuous position in appearance in the front of the slot machine, and is directly operated by the player. It has thus been an important portion to develop for an appeal to the player.

The applicant of the present invention has also developed a switch unit that has a sufficient appeal as a switch unit provided on the operation board, and filed the application for this switch unit prior to the present application (Unexamined Japanese Patent Publication No. 2014-44833, published in Mar. 13, 2014). This switch unit is configured such that an operation unit including a plurality of pressable operation buttons is disposed on a display device in a stacked manner, and an image displayed on the display device can be viewed through the transparent operation buttons. Hence it is possible to make a display performance of displaying various images on the display device.

Further, in this switch unit, a printed circuit board mounted with an LED is provided below the operation button, while a frame-like light guiding body is provided on the periphery (outer periphery) of the operation button. Hence it is also possible to make a light performance of illuminating the periphery of the operation button.

In the printed circuit board, an opening is provided in a position corresponding to the operation button, and the LED is provided on its periphery. A rubber sheet is provided on the printed circuit board so as to cover the LED. A thickness portion of this rubber sheet is devised so as to allow passage of light advancing upward in the light guiding body while shielding light advancing laterally outward which causes leakage of light to the adjacent operation button. Hence it is possible to illuminate the periphery of each operation button with an intended color, so as to make a light performance with high degree of perfection.

In order to make a display performance with a larger impact, the applicant of the present invention has made a display device large in size and configured such that a plurality of operation buttons are disposed so as to be spaced from each other in a display region of the display device, while avoiding the peripheral edge of the display region, thereby making an image also viewable through between the operation buttons and the periphery of a placement region of the operation buttons.

However, in this case, the rubber sheet made of a single sheet needs to be cut into pieces for the respective operation buttons, thus increasing the number of parts and complicating a process flow. Further, the cut rubber sheet is apt to be displaced at the time of assembly. When the displacement occurs, in the light performance of illuminating the periphery of the operation button, light leaks to the inside or the outside of the operation button to interfere with a display performance made by the display device or interfere with a light performance of the other operation button, thus leading to a decrease in degree of perfection of the performance.

SUMMARY

A switch unit according to one or more embodiments of the present invention may be capable of making a display performance with a larger impact by displaying an image also between operation buttons and on the periphery of a placement region of the operation buttons, and is capable of reducing light leakage in a light performance without increasing the number of parts or complicating a process flow.

A switch unit according to one or more embodiments of the present invention includes a display part configured to display an image; and an operation part provided on the display part in a stacked manner. The operation part includes a plurality of press buttons each having a pressable top surface formed to be transparent, a transparent base having a plurality of openings formed so as to be spaced from each other in positions corresponding to a display region of the display part, while avoiding a peripheral edge of the display region, and a transparent substrate provided below the base and having a light source in a position corresponding to the outer periphery of the top surface. The press button includes, and forms into a unit, a button body having the top surface, a frame-like light guiding body provided in a flange shape below the button body and provided so as to cover the light source, a transparent frame-like cover configured to cover the button body and an outer periphery of the light guiding body except for the top surface, an inner light shielding part integrally formed with an inner peripheral surface of the light guiding body and configured to shield light leaking to an inner peripheral side of the top surface, and an outer light shielding part integrally formed with an outer peripheral surface of the cover and configured to shield light leaking to an outer peripheral side of the cover. The press button is mounted on the transparent substrate via the opening provided in the base.

According to the above configuration, the opening in the base to position the press button is formed such that the plurality of openings are formed so as to be spaced from each other while avoiding the peripheral edge of the display region. Hence a display performance with a larger impact can be made by displaying an image on the display part also between the press buttons and on the periphery of the placement region of the press buttons.

In a light performance of propagating light of the light source to the inside of the frame-like light guiding body to illuminate the outer periphery of the top surface of the press button, the inner light shielding part shields light leaking to the inner peripheral side of the top surface, and the outer light shielding part shields light leaking to the outer peripheral side of the cover. Hence it is possible to prevent light from leaking to the inner peripheral side of the top surface and the outer peripheral side of the cover to interfere with a display performance made by the display part or interfere with a light performance made by another adjacent press button.

Since the press button is formed as a unit, the inner light shielding part and the outer light shielding part can be positioned on the transparent substrate without being displaced, by simple operation of just mounting the press button onto the transparent substrate via the opening in the base, thereby making the assembly easy.

Furthermore, since the inner light shielding part and the outer light shielding part are integrally formed with the light guiding body or the cover, in the assembly of the press button, the displacement of the inner light shielding part and the outer light shielding part does not occur, and the number of parts is small, thereby making the assembly easy.

The switch unit of the present invention can further be configured such that the button body integrally formed of the top surface, a frame-like stand that is formed a size larger than the top surface, and an elastically transformable bending transformation part configured to couple between the top surface and the stand.

According to the above configuration, when the top surface is pressed down, the bending transformation part is bent, and only the top surface is pressed downward. When the pressed-down state of the top surface is canceled, the top surface is pushed up upward by elastic force of the bending transformation part to return to its fixed position. As thus described, the button body is elastically transformed to achieve a pressable configuration, thus making it unnecessary to separately provide a mechanism for supporting the top surface in a pressable manner and returning the top surface to its fixed position, the mechanism impeding a display performance made by the display part.

A game machine including the switch unit of the present invention is also taken as belonging to a category of the present invention.

According to the present invention, the effect of being able to provide a switch unit can be exerted, the switch unit being capable of making a display performance with a larger impact by displaying an image also between press buttons and on the periphery of a placement region of the press buttons, and capable of reducing light leakage in a light performance without increasing the number of parts or complicating a process flow.

DETAILED DESCRIPTION

Hereinafter, embodiments of the present invention is described with reference to the attached drawings. However, the present invention is not limited to the embodiments described below, and various design changes can be made without departing from the gist of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A switch unit of the present invention can be employed in operation boards of various game machines, industrial equipment, and consumer equipment. In the embodiment, a description is given of an example of mounting the switch unit in a slot machine as a game machine installed in a game hall such as a casino.

Figure 1:
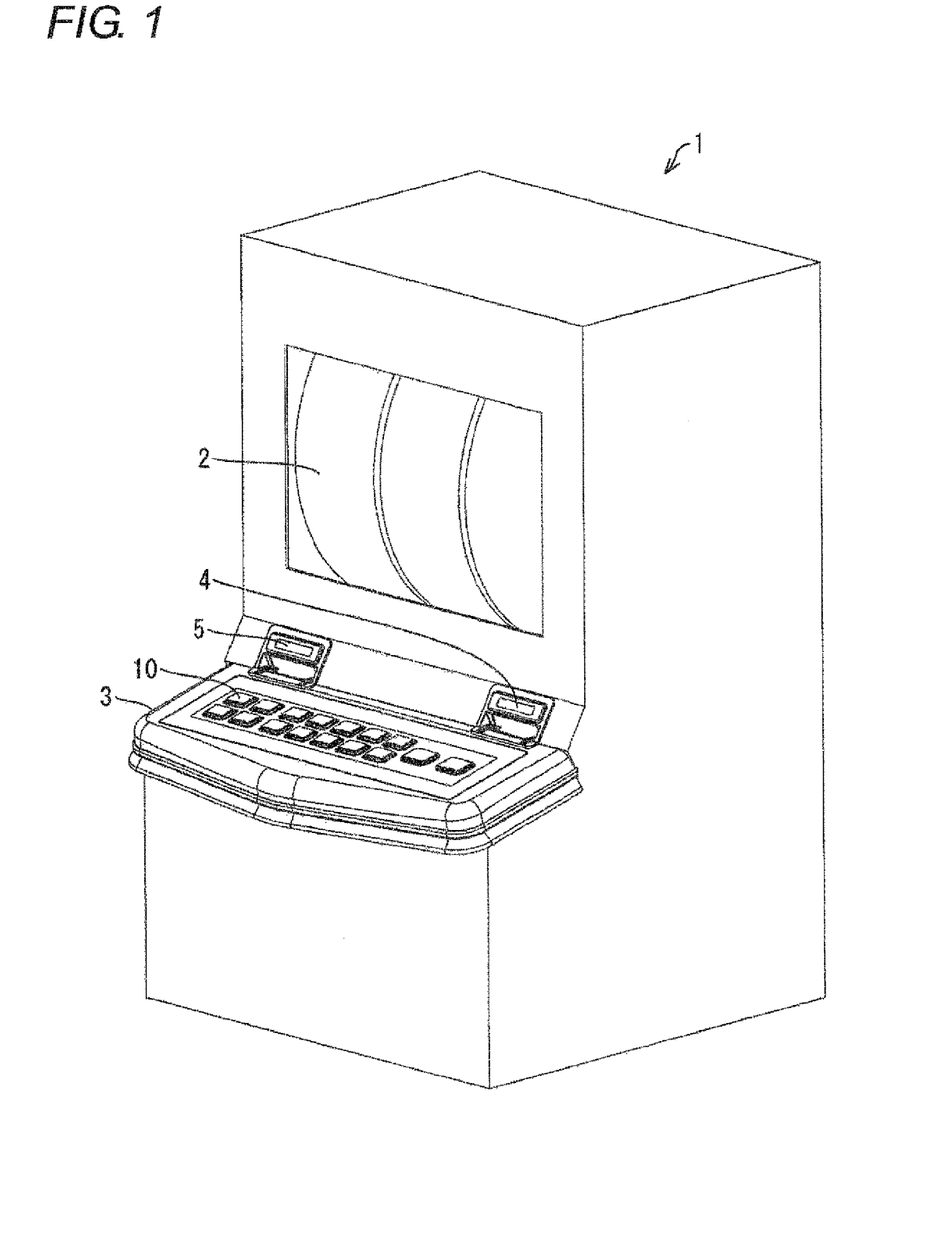
FIG. 1 is a schematic perspective view of a slot machine mounted with a switch unit according to an embodiment.

FIG. 1 is a schematic perspective view of a slot machine 1 mounted with a switch unit 10 according to the embodiment. As illustrated in FIG. 1, in the slot machine 1, a reel part 2 is provided at the center of the front surface facing a player (operator), and an operation board 3 is provided below the reel part 2.

The reel part 2 includes a plurality of reels (not illustrated) displaying a plurality of types of symbols. The plurality of reels start spinning by the player pressing down a SPIN button, described later, in the switch unit 10 and automatically stop by control of the equipment. A winning combination is determined based on a matching pattern of symbols and the matched symbols which are displayed in a window (not illustrated) of the reel part 2 when the reels stop. A prize is given to the player in accordance with the determined winning combination and the number of bets. Other than the configuration where the reels are actually provided, the reel part 2 may have a configuration where the reel part 2 is formed of an LCD (liquid crystal display) and an image corresponding to the reels is displayed, or some other configuration.

The operation board 3 is provided with the switch unit 10 including a plurality of press-button switches, a bill inlet 4, and a ticket outlet 5. The switch unit 10 accepts specification of the number of bets and an instruction to start spinning of the reels at the time of the player playing with the slot machine 1.

Figure 2:
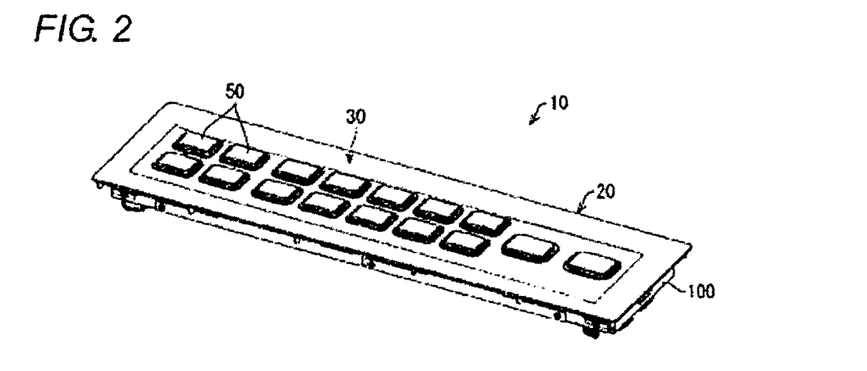
FIG. 2 is a perspective view illustrating an appearance of the switch unit.
Figure 3:
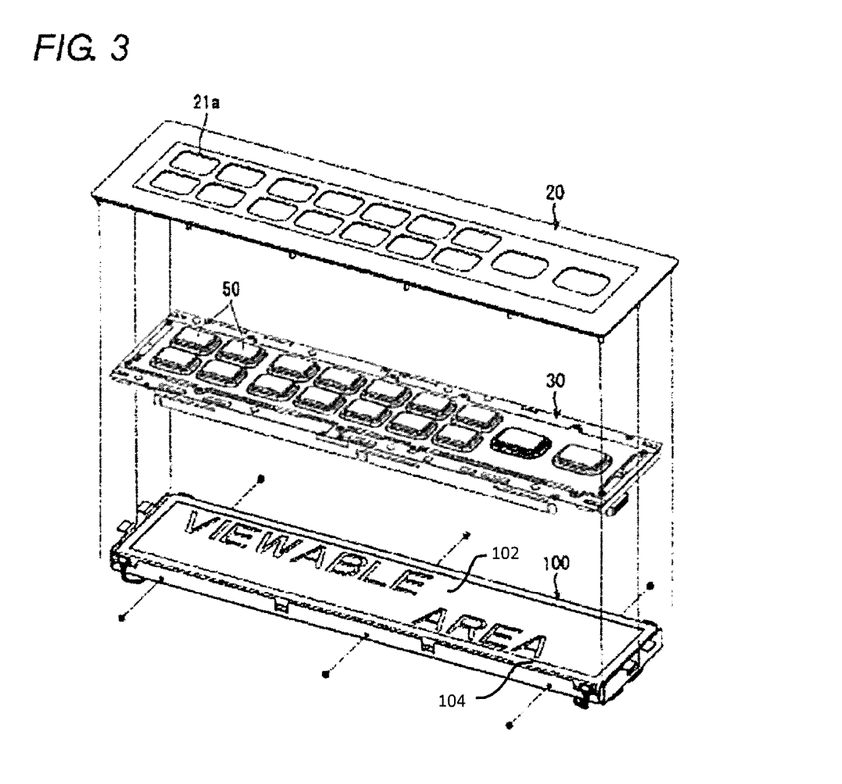
FIG. 3 is an exploded perspective view of the switch unit.

FIG. 2 is a perspective view illustrating an appearance of the switch unit 10, and FIG. 3 is an exploded perspective view of the switch unit 10. As illustrated in FIGS. 2 and 3, the switch unit 10 is formed in a rectangular shape and includes a display device (display part) 100, an operation unit (operation part) 30, and a top plate 20.

The display device 100 is formed of an LCD or the like, for example, and displays image data concerning a game. For example, the display device 100 displays images of functions of the respective press buttons 50 in the operation unit 30 disposed thereabove, a performance of the game, the characters that appear in the game, and the like. Thereby, the display device 100 can appeal to the player to play with its own device.

Each member of the operation unit 30 is made of a transparent material except for a part thereof. Accordingly, the player can view the image displayed on the display device 100 through the operation unit 30. The operation unit 30 has a plurality of press buttons 50 and is used for inputting the number of bets (bet button), and instructing to start a game (spin button).

The top plate 20 is a transparent cover provided on the upper surface of the operation unit 30. An opening 21a through which each press button 50 projects is formed in a position corresponding to each press button 50 in the top plate 20. Further, the top plate 20 is made of a transparent material except for its peripheral edge.

The display device 100 and the operation unit 30 are fixed with screws or the like to be formed into a unit (integrated), and thereon, the top plate 20 is provided.

Figure 4:
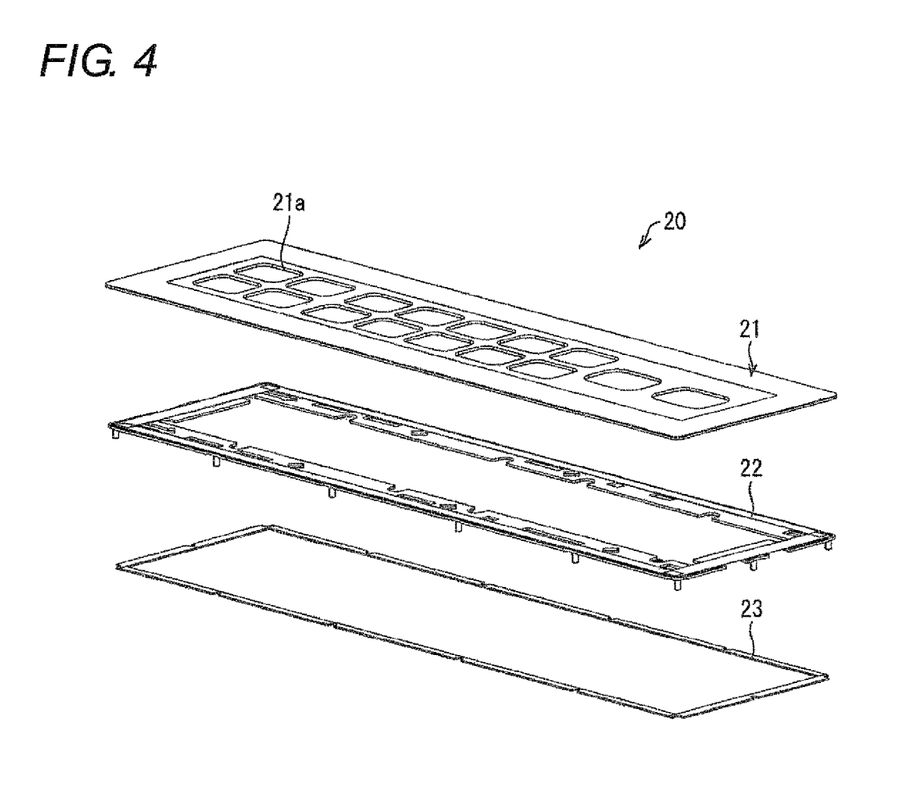
FIG. 4 is an exploded perspective view of a top plate in the switch unit.

FIG. 4 is an exploded perspective view of the top plate 20. As illustrated in FIG. 4, the top plate 20 includes a top plate body 21, a top frame 22, and water-resistant rubber 23.

The top plate body 21 is made of a transparent material such as transparent plastic, and formed with the plurality of openings 21a. The top frame 22 is a frame-like support for supporting the peripheral edge of the top plate body 21. The peripheral edge of the top frame 22 is supported by a casing of the slot machine 1. The water-resistant rubber 23 is attached to the rear side of the peripheral edge of the top frame 22 with, for example, a double-sided tape or the like.

Figure 5:
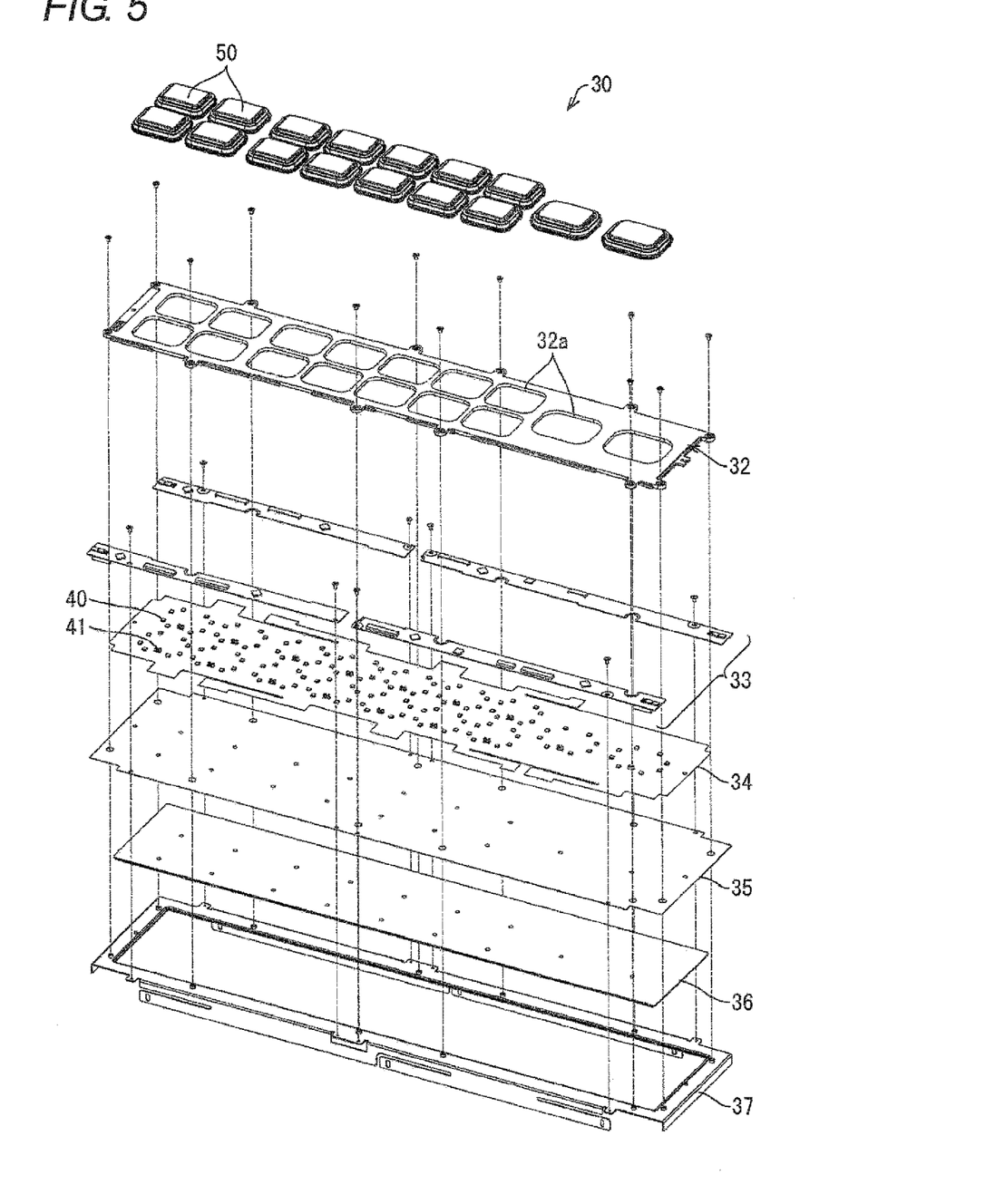
FIG. 5 is an exploded perspective view of an operation unit in the switch unit.
Figure 6:
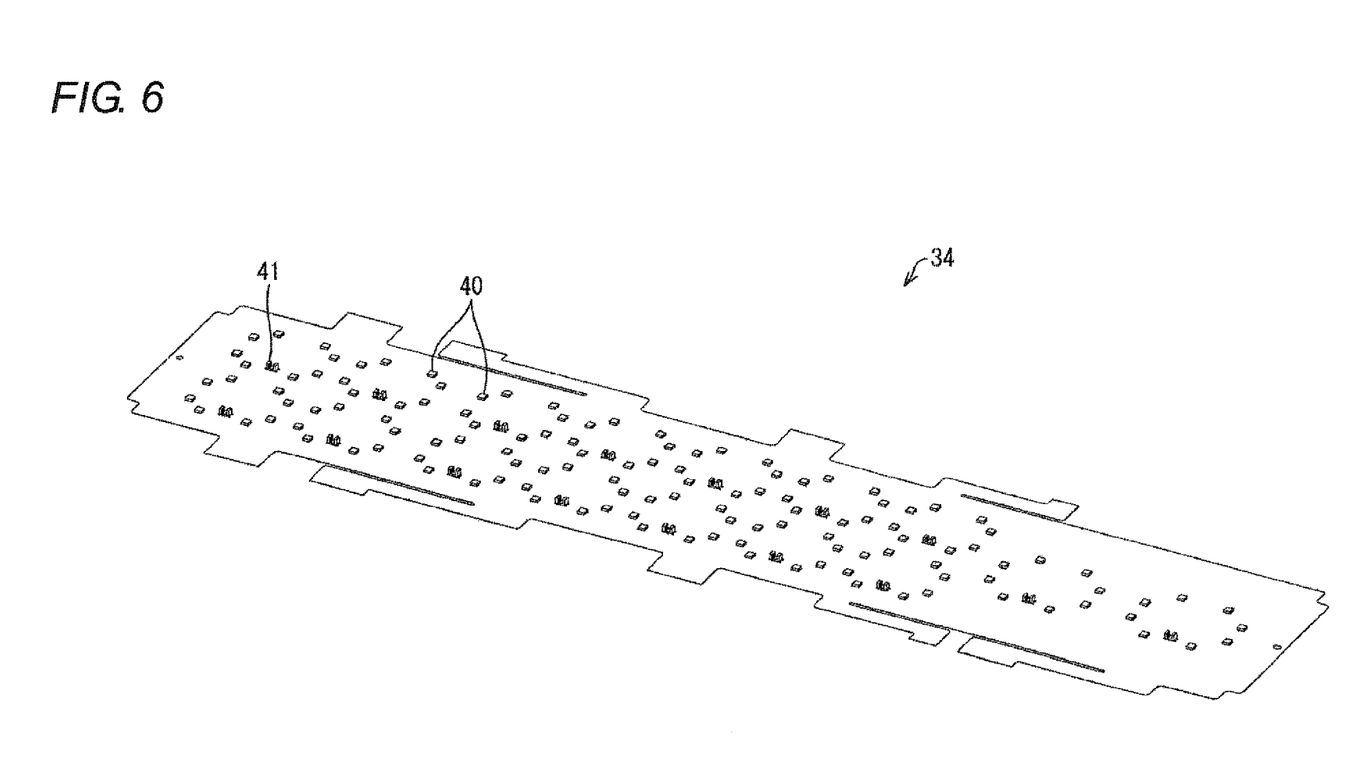
FIG. 6 is a perspective view of a transparent substrate in the operation unit.

FIG. 5 is an exploded perspective view of the operation unit 30, and FIG. 6 is a perspective view of a transparent substrate 34. As illustrated in FIG. 5, the operation unit 30 includes a plurality of press buttons 50, a switch base (base) 32, four LED control substrates 33, the transparent substrate 34, an insulating sheet 35, a spacer 36, and a base frame 37.

The plurality of press buttons 50 are different in size, but the same in structure, and therefore, a detail thereof is described later with reference to FIG. 7. The switch base 32 is made of a transparent material such as transparent plastic, and a plurality of openings 32a are formed in positions corresponding to a display region 102 of the display device 100. The press buttons 50 are mounted on the transparent substrate 34 located below the openings 32a via the openings 32a. The openings 32a are formed so as to be spaced from each other while avoiding the peripheral edge 104 of the display region 102, which is shown in FIG. 3. Hence the image of the display device 100 is displayed also between the press buttons 50 and on the periphery of a placement region of the press buttons 50.

The transparent substrate 34 is made of a thin transparent resin sheet such as an OHP sheet. As illustrated in FIG. 6, a plurality of LEDs 40 and a plurality of photo-sensors 41 which are electronic components are mounted in positions corresponding to the press buttons 50 on the transparent substrate 34. The LED 40 illuminates the peripheral edge of the press button 50, specifically the periphery of a top surface 52a described later, and is a full-color LED. The photo-sensor 41 detects pressing-down of the press button 50, specifically the pressing-down of the top surface 52a. In the example of FIG. 6, one photo-sensor 41 and two LEDs 40 for each side, that is, eight LEDs 40 in total are mounted with respect to one press button 50.

Returning to FIG. 5, four LED control substrates 33 are electrically connected with the transparent substrate 34 to drive the plurality of LEDs 40. Further, the four LED control substrates 33 detect pressing-down of the press button 50 based on a signal inputted from the photo-sensor 41.

The transparent substrate 34 and the four LED control substrates 33 are provided on the base frame 37 with the insulating sheet 35 interposed therebetween, and the switch base 32 is further provided thereon. The parts from the switch base 32 to the base frame 37 are fixed with screws or the like to be formed into a unit (integrated).

It is to be noted that the spacer 36 is a thickness adjustment member for filling a gap between the display device 100 and the insulating sheet 35. Naturally, the spacer 36 and the insulating sheet 35 are also made of transparent materials.

Figure 7:
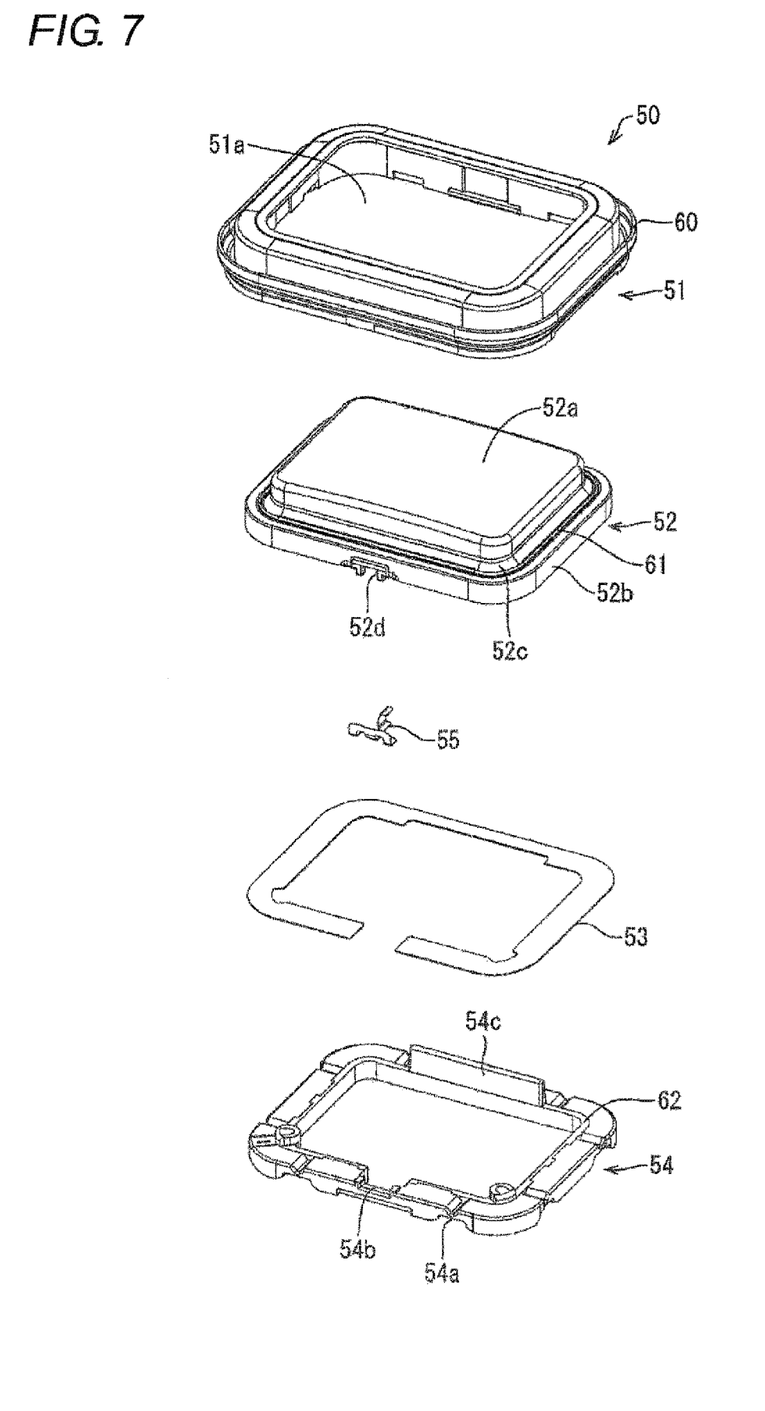
FIG. 7 is an exploded perspective view of a press button in the operation unit.

FIG. 7 is an exploded perspective view of the press button 50. As illustrated in FIG. 7, the press button 50 includes a button cover (cover) 51, a button body 52, a light shielding piece 55, a diffusion member 53, and a light guiding member (light guiding body) 54.

The button cover 51 is made of a transparent material such as transparent plastic, and is a frame-like member having the opening 51a on its upper surface. The button cover 51 is attached from above the button body 52 so as to cover an outer peripheral lower part of the button body 52, including the light guiding member 54 provided at the lower end thereof.

A light-shielding sealing part (outer light shielding part) 60 is formed in the outer peripheral lower part of the button cover 51. The light-shielding sealing part 60 is a wall-like projection annularly provided so as to be placed on the whole outer periphery of the button cover 51, and is made of a black resin material having elasticity, for example.

Although described later in detail, the light-shielding sealing part 60 takes a water-resistant structure as follows: the press button 50 adheres to the members therearound (the switch base 32 and the top plate body 21), while being mounted in the opening 32a in the switch base 32, to seal the outer peripheral side of the press button 50. Further, while taking the water-resistant structure, the light-shielding sealing part 60 shields light leaking to the outer peripheral side of the button cover 51. The light-shielding sealing part 60 as thus described is integrally formed with the button cover 51 by double-molding, for example.

The button body 52 is a lid-like member with its bottom surface open, and the top surface 52a is pressable. The lower part of the button body 52 serves as a frame-like stand 52b that is formed a size larger than the top surface 52a, and an elastically transformable bending transformation part 52c couples the top surface 52a with the stand 52b. An attachment part 52d for attachment of the light shielding piece 55 is formed on one surface (lower surface) of the stand 52b where the light guiding member 54 is to be provided.

With the button cover 51 having been attached, the top surface 52a projects upward through the opening 51a of the button cover 51. When the top surface 52a is pressed down, the bending transformation part 52c is bent, and only the top surface 52a is pressed down. When the pressed-down state of the top surface 52a is canceled, the top surface 52a is pushed up upward by elastic force of the bending transformation part 52c to return to its fixed position.

The top surface 52a and the stand 52b are made of transparent plastic or the like, and the bending transformation part 52c is made of elastomer resin having optical transparency, for example. The bending transformation part 52c is integrally formed with the top surface 52a and the stand 52b by double-molding, for example. Further, an inner sealing part 61 made of the same resin material as that for the bending transformation part 52c is integrally formed with the bending transformation part 52c in a portion abutting on the rear surface of the button cover 51. The inner sealing part 61 is a wall-like projection annularly provided so as to be placed on the whole outer periphery of the bending transformation part 52c. Although described later in detail, the inner sealing part 61 takes a water-resistant structure as follows: even when the top surface 52a is pressed down, the leading end of the projection keeps adhering to the rear side of the button cover 51 to seal a gap between the button body 52 and the button cover 51.

The light shielding piece 55 is a detection target for the photo-sensor 41 on the transparent substrate 34 described above. The light shielding piece 55 is attached to the attachment part 52d and vertically moves together with the top surface 52a of the button body 52.

The light guiding member 54 is a frame-like light guiding body made of a light guiding material, and is attached below the stand 52b of the button body 52. A recessed part 54a for accommodating the LED 40 on the transparent substrate 34 is formed on one surface (lower surface) of the light guiding member 54, the surface being in contact with the transparent substrate 34. Although not illustrated, the bottom surface of the light guiding member 54 is processed so as to propagate partially present light of the LED 40 throughout the light guiding member 54 to form it into a surface light source.

Further, on the upper surface of the light guiding member 54, a recessed part 54b for avoiding interference with the light shielding piece 55 is formed, and a projection 54c that abuts on the button body 52 is formed on the opposite side to the recessed part 54b. Forming the projection 54c controls the button body 52 such that only the side thereof provided with the light shielding piece 55 is lowered with respect to the button cover 51. In addition, the light shielding piece 55 is normally provided on the closer side of the press button 50 to the player.

Further, an inner light shielding part 62 for shielding light leaking from the light guiding member 54 to the inner peripheral side of the top surface 52a is formed on the inner peripheral surface of the light guiding member 54. The inner light shielding part 62 is provided so as to be placed on the whole inner peripheral surface of the light guiding member 54, and is made of a black resin material having elasticity, for example. The inner light shielding part 62 is integrally formed with the light guiding member 54 by double-molding, for example.

The diffusion member 53 is a sheet-like member provided between the stand 52b of the button body 52 and the light guiding member 54. The diffusion member 53 is provided for scattering light released from the light guiding member 54 to reduce the unevenness of brightness. The diffusion member 53 is formed in the frame shape as is the light guiding member 54, and is formed with a cut for allowing passage of the light shielding piece 55.

The press button 50, including the button cover (cover) 51, the button body 52, the light shielding piece 55, the diffusion member 53, and the light guiding member (light guiding body) 54, is formed as a unit (integrated).

Figure 8:
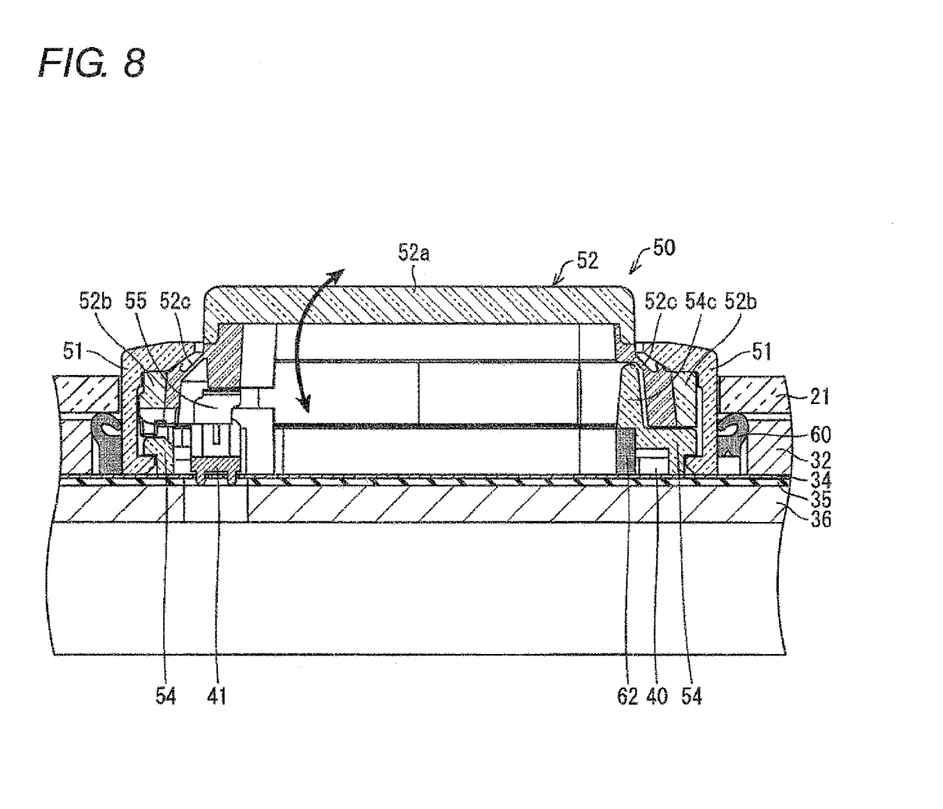
FIG. 8 is a sectional view of a main part for explaining movement of the press button in the switch unit.

FIG. 8 is a sectional view of the main part for explaining movement of the press button 50 in the switch unit. As an arrow in FIG. 8 indicates, when the top surface 52a of the press button 50 is pressed down by the player, the one side of the top surface 52a having the projection 54c is not pressed down, while the side thereof having the light shielding piece 55 is pressed down due to bending of the bending transformation part 52c. At this time, the top surface 52a abuts onto the light shielding piece 55 and also presses down the light shielding piece 55. Hence the photo-sensor 41 senses the light shielding piece 55 to detect turning-on of the press button 50.

Figure 9:
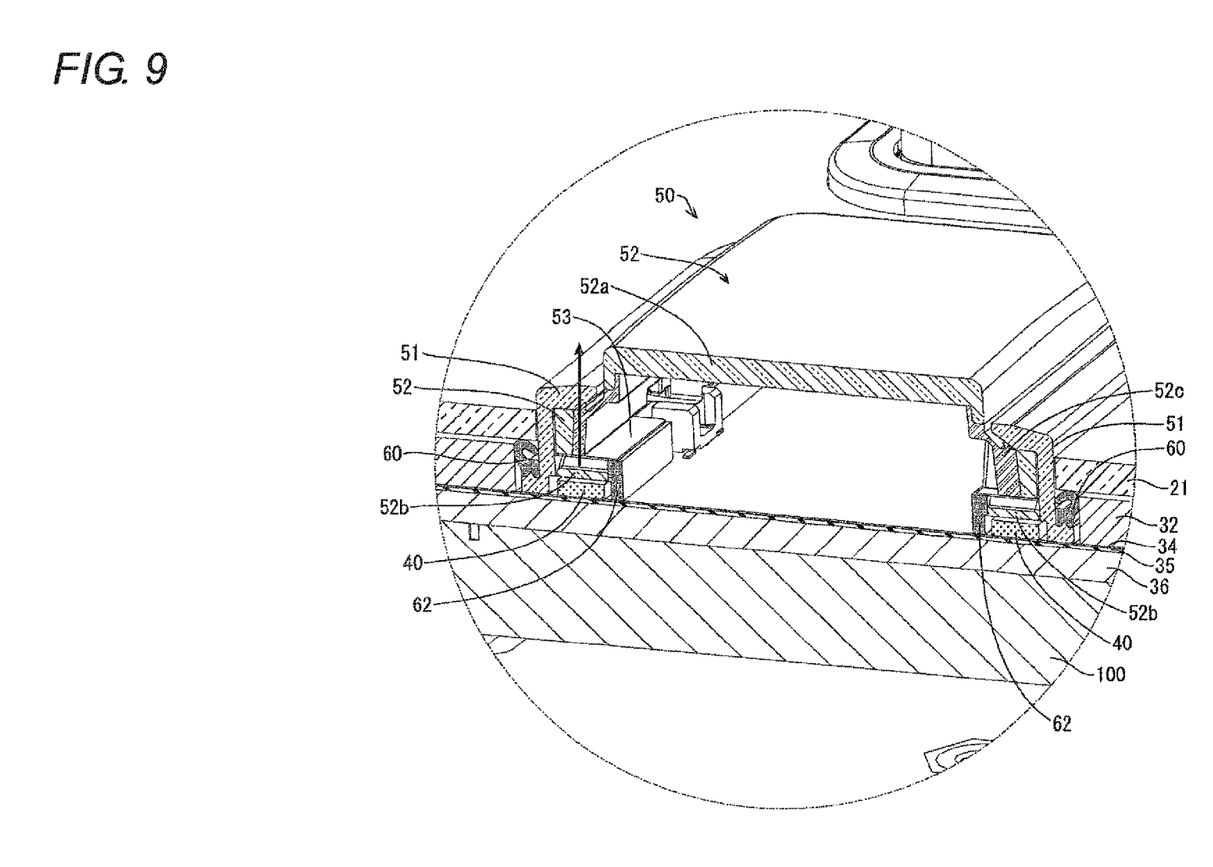
FIG. 9 is a sectional perspective view of the main part for explaining a light performance in the switch unit.

FIG. 9 is a sectional perspective view of the main part for explaining a light performance in the switch unit 10. As illustrated in FIG. 9, the press button 50 is provided with the button cover 51, the bending transformation part 52c, the stand 52b, the light guiding member 54, and the diffusion member 53 on the outer periphery of the top surface 52a. The LED 40 is disposed in a position corresponding to the outer periphery of the top surface 52a on the transparent substrate 34. Hence it is possible to make the outer periphery of the top surface 52a of the press button 50 emit light with various colors, so as to enhance the performance effect.

The inner light shielding part 62 is provided inside the button body 52, more specifically on the inner peripheral surface of the light guiding member 54, to shield light leaking from the light guiding member 54 to the inside of the top surface 52a. Hence it is possible to prevent (reduce) interference of light in the light performance with an image of the display device displayed inside the top surface 52a.

Further, the light-shielding sealing part 60 is provided outside the press button 50, more specifically on the outer peripheral surface of the button cover 51, to shield light leaking from the light guiding member 54 to the outside of the press button 50 via the button cover 51. The light-shielding sealing part 60 fills a gap between the button cover 51 and the switch base 32, and its leading end part is squashed by the top plate body 21 to be inwardly elastically transformed. The light-shielding sealing part 60 in the squashed state can prevent (reduce) interference of light in the light performance with an image of the display device displayed outside the press button 50.

Figure 10:
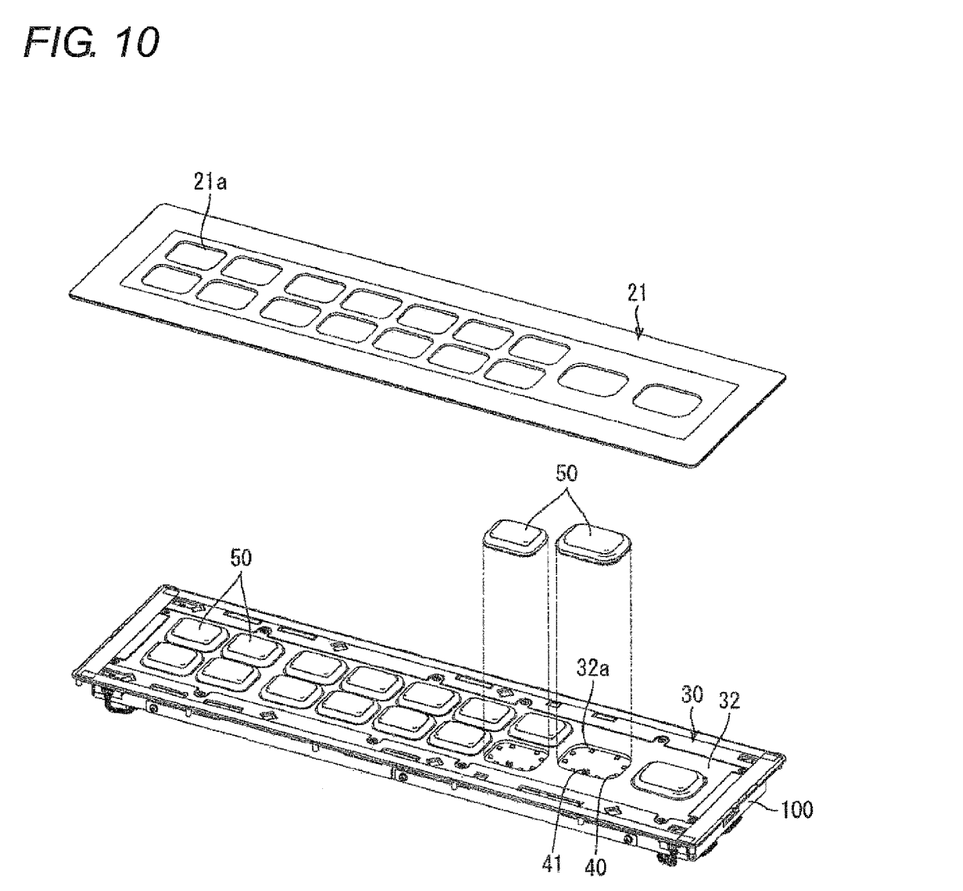
FIG. 10 is a perspective view for explaining how to attach the press button in the switch unit.

FIG. 10 is a perspective view for explaining how to attach the press button 50 in the switch unit 10. As illustrated in FIG. 10, by removal of the top plate 20, the press button 50 formed as a unit becomes detachable from the operation unit 30 in the state of being integrated with the display device 100. With the press button 50 having been removed, the LED 40 and the photo-sensor 41 mounted on the transparent substrate 34 are exposed through the opening 32a of the switch base 32. The press button 50 is attached so as to be mounted on the transparent substrate 34 via the opening 32a.

Figure 11:
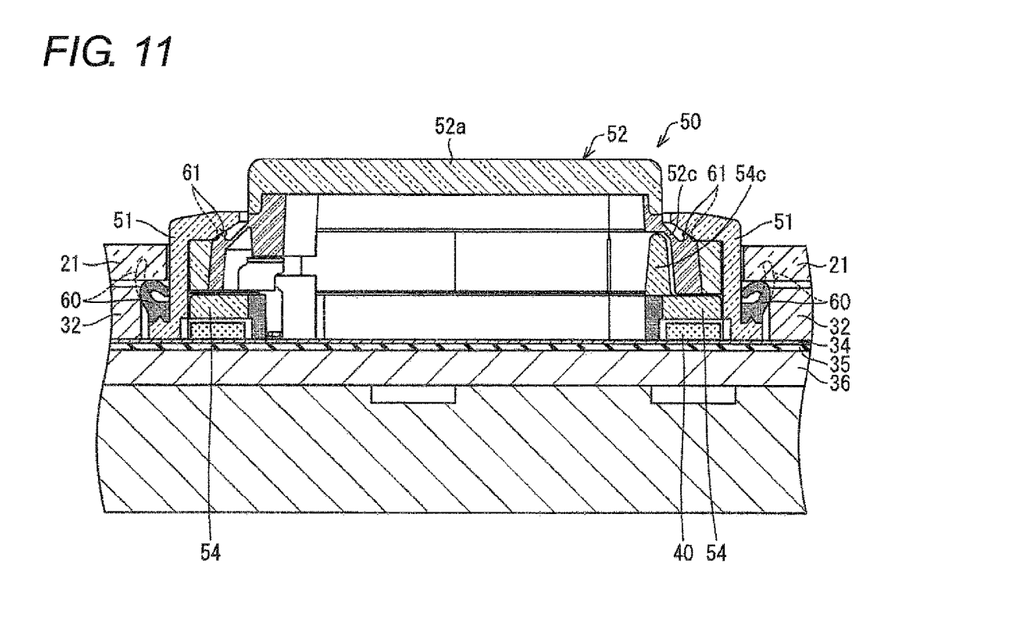
FIG. 11 is a sectional view of the main part for explaining a water-resistant structure in the switch unit.

FIG. 11 is a sectional view of the main part for explaining a water-resistant structure in the switch unit 10. As illustrated in FIG. 11, with the switch unit 10 having been assembled, the light-shielding sealing part 60 provided on the outer peripheral surface of the button cover 51 adheres to the inner wall surface of the opening 32a to seal a gap between the opening 32a and the outer periphery of the button cover 51. Further, the rising leading end part of the light-shielding sealing part 60 is squashed by the top plate body 21 to be elastically transformed, thereby to more firmly seal the gap between the opening 32a and the outer periphery of the button cover 51 (a water-resistant structure of the outer peripheral side of the press button 50).

Accordingly, even when the press button 50 is made detachable, entry of a liquid from between the press button 50 and the opening 32a in the switch base 32 can be inhibited to prevent the electronic component, such as the LED 40, mounted on the transparent substrate 34 from getting wet. Further, since the light-shielding sealing part 60 has been formed by the double-molding, it is possible to enhance the sealability between the button cover 51 and the light-shielding sealing part 60, compared with a configuration where different members are integrated by being pasted together.

Moreover, in a state where the button cover 51 is fitted in the outer periphery of the button body 52, the inner sealing part 61 provided on the bending transformation part 52c is squashed by the button cover 51 to be elastically transformed. The inner sealing part 61 in the elastically transformed state adheres to the rear surface of the button cover 51 to seal the gap between the button body 52 and the button cover 51. Even when the top surface 52a is pressed down, the inner sealing part 61 keeps adhering to the rear side of the button cover 51 to seal the gap between the button body 52 and the button cover 51.

Accordingly, even when the top surface 52a is made pressable, entry of a liquid from between the button cover 51 and the button body 52 having the top surface 52a can be inhibited to prevent the electronic component, such as the LED 40, mounted on the transparent substrate 34 from getting wet. Further, since the inner sealing part 61 has been formed by the double-molding, it is possible to enhance sealability of the button body 52 itself, compared with a configuration where different members are integrated by being pasted together.

Figure 12:
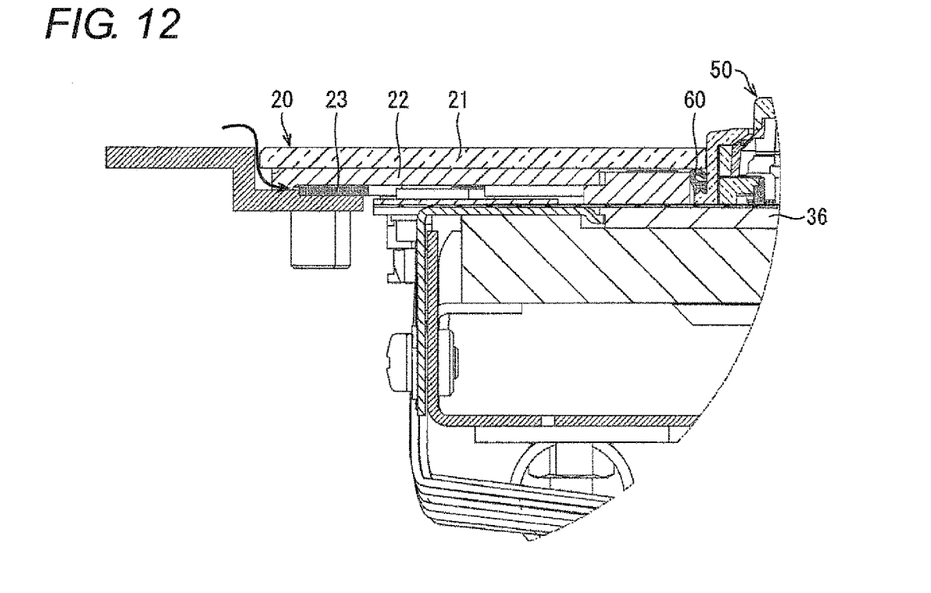
FIG. 12 is a sectional view of the main part for explaining a water-resistant structure between the switch unit and the slot machine.

FIG. 12 is a sectional view of the main part for explaining a water-resistant structure between the switch unit 10 and the slot machine. As illustrated in FIG. 12, in a state where a unit formed of the display device 100 and the operation unit 30 is attached to the slot machine 1, when the top plate 20 is provided on the unit, the water-resistant rubber 23 adheres to a casing 101 of the slot machine 1 to inhibit entry of a liquid from between the top plate 20 and the casing 101 of the slot machine 1.

The present invention is not limited to the above described embodiments, but various modifications can be made within the scope defined in the claims. An embodiment obtained in appropriate combination of the technical methods disclosed respectively in the different embodiments is also included in the technical scope of the present invention.

The present invention can be employed in operation boards of various game machines, industrial equipment, consumer equipment, and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A switch unit comprising:
a display part configured to display an image; and
an operation part provided on the display part in a stacked manner, wherein
the operation part includes:
a plurality of press buttons each having a pressable top surface formed to be transparent;
a transparent base having a plurality of openings formed so as to be spaced from each other in positions corresponding to a display region of the display part, while avoiding a peripheral edge of the display region; and
a transparent substrate provided below the base and having a light source in a position corresponding to an outer periphery of the top surface, and
each of the press buttons includes, and forms into a unit,
a button body having the top surface,
a frame-like light guiding body provided in a flange shape below the button body and provided so as to cover the light source,
a transparent frame-like cover configured to cover the button body and an outer periphery of the light guiding body except for the top surface,
an inner light shielding part integrally formed with an inner peripheral surface of the light guiding body and configured to shield light leaking to an inner peripheral side of the top surface, and
an outer light shielding part integrally formed with an outer peripheral surface of the cover and configured to shield light leaking to an outer peripheral side of the cover,
the press button being mounted on the transparent substrate via the opening provided in the base.

2. The switch unit according to claim 1, wherein the button body is integrally formed of the top surface, a frame-like stand that is larger than the top surface, and an elastically transformable bending transformation part configured to couple the top surface with the stand.

3. A game machine comprising the switch unit according to claim 2.

4. A game machine comprising the switch unit according to claim 1.

* * * * *